United States Patent
Bernstein et al.

(10) Patent No.: US 7,627,675 B2
(45) Date of Patent: Dec. 1, 2009

(54) METHODS AND DEVICES FOR REGULATING TRAFFIC ON A NETWORK

(75) Inventors: Alon Bernstein, Sunnyvale, CA (US); Chrisanto Leano, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 349 days.

(21) Appl. No.: 10/428,865

(22) Filed: May 1, 2003

(65) Prior Publication Data
US 2004/0221032 A1 Nov. 4, 2004

(51) Int. Cl.
*G06F 15/173* (2006.01)
(52) U.S. Cl. ............ 709/225; 709/226; 709/223; 709/224; 709/232; 709/233; 709/235
(58) Field of Classification Search ......... 709/223–225, 709/226, 232–235; 370/235, 395.4, 468, 370/230.1, 352, 229
See application file for complete search history.

(56) References Cited

U.S. PATENT DOCUMENTS

| | | | | |
|---|---|---|---|---|
| 6,320,203 | B1 * | 11/2001 | Akram ................... | 257/69 |
| 6,331,987 | B1 * | 12/2001 | Beser .................... | 370/486 |
| 6,549,520 | B1 * | 4/2003 | Gross et al. ............. | 370/242 |
| 6,678,893 | B1 * | 1/2004 | Jung .................... | 725/111 |
| 6,774,237 | B2 * | 8/2004 | Renhowe et al. ......... | 546/157 |
| 6,862,265 | B1 * | 3/2005 | Appala et al. ........... | 370/235 |
| 6,950,395 | B1 * | 9/2005 | Bashandy et al. ........ | 370/230.1 |
| 7,028,088 | B1 * | 4/2006 | Koperda et al. .......... | 709/229 |
| 7,149,223 | B2 * | 12/2006 | Liva et al. ............... | 370/401 |
| 7,161,945 | B1 * | 1/2007 | Cummings .............. | 370/401 |
| 7,239,607 | B1 * | 7/2007 | Vijeh et al. ............. | 370/230 |
| 7,299,284 | B2 * | 11/2007 | McKinnon et al. ........ | 709/225 |
| 2001/0044845 | A1 * | 11/2001 | Cloonan et al. .......... | 709/226 |
| 2002/0021465 | A1 * | 2/2002 | Moore et al. ............ | 359/125 |
| 2002/0065907 | A1 * | 5/2002 | Cloonan et al. .......... | 709/223 |
| 2002/0075805 | A1 | 6/2002 | Gupta et al. ............. | 370/235 |

(Continued)

FOREIGN PATENT DOCUMENTS

JP    P2000-183880    6/2000

(Continued)

OTHER PUBLICATIONS

Office Action for Chinese Patent Application No. 200480010366.1 dated Jun. 29, 2007. (CISCP337CN).

(Continued)

*Primary Examiner*—Kenny S Lin
*Assistant Examiner*—Lan-Dai T Truong
(74) *Attorney, Agent, or Firm*—Weaver Austin Villeneuve & Sampson LLP

(57) ABSTRACT

Methods and devices are provided for regulating traffic on a network. According to some aspects of the invention, if a subscriber's upstream traffic exceeds a predetermined level over a first period of time, the subscriber's quality of service is adjusted without requiring the subscriber to re-register. According to some embodiments, a first token bucket is used to determine whether the subscriber's upstream traffic exceeds the predetermined level over the first period of time. In some such embodiments, the first token bucket is used to control the burst size of another token bucket, depending on the subscriber's upstream traffic during the first period of time.

17 Claims, 11 Drawing Sheets

U.S. PATENT DOCUMENTS

| | | | |
|---|---|---|---|
| 2002/0075949 A1* | 6/2002 | Banerjea et al. | 375/222 |
| 2002/0116655 A1* | 8/2002 | Lew et al. | 713/323 |
| 2002/0129143 A1* | 9/2002 | McKinnon et al. | 709/225 |
| 2002/0136203 A1* | 9/2002 | Liva et al. | 370/352 |
| 2002/0143911 A1* | 10/2002 | Vicente et al. | 709/223 |
| 2003/0033379 A1* | 2/2003 | Civanlar et al. | 709/218 |
| 2003/0058794 A1* | 3/2003 | Pantelias et al. | 370/230 |
| 2003/0065809 A1* | 4/2003 | Byron | 709/232 |
| 2003/0086413 A1* | 5/2003 | Tartarelli et al. | 370/352 |
| 2003/0107988 A1* | 6/2003 | Lodha et al. | 370/229 |
| 2003/0154488 A1* | 8/2003 | Strater et al. | 725/95 |
| 2003/0174650 A1* | 9/2003 | Shankar et al. | 370/235 |
| 2003/0202534 A1* | 10/2003 | Cloonan | 370/468 |
| 2003/0223414 A1* | 12/2003 | Wong | 370/389 |
| 2004/0100967 A1* | 5/2004 | Robotham et al. | 370/395.4 |
| 2005/0080918 A1* | 4/2005 | Wu et al. | 709/233 |
| 2005/0083845 A1* | 4/2005 | Compton et al. | 370/235 |

FOREIGN PATENT DOCUMENTS

SE     EP 1/225/734 A2 * 12/2001

OTHER PUBLICATIONS

Notification of Transmittal of the International Search Report and the Written Opinion of the International Searching Authority, or the Declaration and International Search Report dated Oct. 15, 2004 for PCT Application No. PCT/USO4/12852. (CISCP337WO).

Written Opinion dated Oct. 15, 2004 for PCT Application No. PCT/USO4/12852. (CISCP337WO).

CA office action dated Jun. 3, 2009 for Application No. 2,520,516. (CISCP337CA).

* cited by examiner

METHODS AND DEVICES FOR REGULATING TRAFFIC ON A NETWORK

BACKGROUND OF THE INVENTION

1. Field of the Invention

The present invention generally relates to access data networks that use at least one shared access communication channel to communicate between a plurality of nodes in the network and a terminal to which the plurality of nodes is connected. More specifically, the present invention provides methods and devices for regulating traffic on such networks.

2. Description of Related Art

Broadband access technologies such as cable, fiber optic, and wireless have made rapid progress in recent years. There has been a convergence of voice and data networks, which is due in part to the deregulation of the telecommunications industry in the United States. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable, high-quality voice/video communication over such networks is not an easy task.

One type of broadband access technology relates to cable modem networks. A cable modem network or "cable plant" employs cable modems, which are an improvement of conventional PC data modems and provide high speed connectivity. Cable modems are therefore instrumental in transforming the cable system into a full service provider of video, voice and data telecommunications services.

Service providers need to make different levels of service available to customers, typically with corresponding differences in price. For example, some customers may need relatively higher data transfer rates than others and are willing to pay a premium for a higher quality of service ("QoS") that can provide such transfer rates. Other customers may be content with a slower and less expensive service. Typically, customers having a higher QoS and customers having a lower QoS use the same type of modem. Service providers can also assign different priority levels to customers having the same QoS. A service provider typically distinguishes between such customers based on configuration files assigned to different classes of customers.

However, service providers must apply other network controls in order to regulate various aspects of network traffic. In order to regulate bursty traffic, network administrators need to ensure that network resources are allocated in a fair and predictable manner, while still allowing customers to transmit bursts of data when appropriate. Two methods of regulating and shaping bursty traffic patterns are illustrated by the "leaky bucket" and "token bucket" models, which are illustrated in FIGS. 1 and 2.

Leaky bucket 150 of FIG. 1 has a capacity 155 for incoming data 160. These data 160 may be, for example, data that a subscriber would like to transmit. In this example, outgoing data 165 from leaky bucket 150 are transmitted at a fixed rate 170. The leaky bucket is useful in preventing data bursts, which is a benefit in terms of bandwidth allocation. However, the leaky bucket may not be satisfactory for subscribers because of its lack of flexibility and the potential for significant delays in data transfer.

FIG. 1A illustrates token bucket 180, which is a somewhat more sophisticated model for shaping data traffic. Tokens 185 may be considered authorizations for transmitting a predetermined unit of data; therefore, tokens are usually measured in bits or bytes. Tokens 185, which are represented as drops in FIG. 1A, flow into token bucket 180 at a fixed rate R, which is measured in data units per time unit (e.g., bits per second). Token bucket 180 has a capacity 190. In this example, token bucket 180 has a capacity of B data units. Capacity B is also referred to as the "burst size" of token bucket 180, because it is equal to the maximum data burst allowed by controller 192.

Data accumulate in buffer 195 until there are enough tokens in token bucket 180 to permit the data to be transmitted. For example, suppose the next data packet 196 awaiting transmission in buffer 195 has a size of b data units, where B>b. If token bucket 180 is full, data packet 196 may be sent immediately. If token bucket 180 is empty, data packet 196 will remain in buffer 195 until b tokens flow into token bucket 180. If token bucket 180 contains N tokens, where N<b, then data packet 196 will remain in buffer 195 until (b−N) tokens flow into token bucket 180.

Typically, if a subscriber were not transmitting data, token bucket 180 would reach its capacity 190 in a time on the order of one second or less. This fact is referenced in RFC 2697, which is hereby incorporated by reference. Section 3, ¶2 notes that "token counts $T_c$ and $T_e$ are updated CIR [the Committed Information Rate, measured in bytes] times per second." The token counts are not updated after the burst size has been reached. Because the burst size is less than the CIR, tokens would stop flowing into the token bucket in less than one second. After token bucket 180 reaches its capacity 190, excess tokens are discarded.

In this fashion, token bucket provides more flexibility than leaky bucket 150. Leaky bucket 150 does not permit data bursts, but instead smoothes bursty traffic. Token bucket 180 allows data bursts, but places limits on how bursty traffic can be. Accordingly, token bucket 180 generally provides more satisfaction to subscribers.

Another problem that must be addressed by service providers is the consumption of disproportionate amounts of network bandwidth. File-sharing applications such as KaZaA, Gnutella, etc., which provide software that causes a subscribers personal computer ("PC") to perform some functions of a server, cause much more upstream traffic than was envisioned by the architects of Data Over Cable System Interface Specification ("DOCSIS") and other protocols. This upstream traffic often causes subscribers to consume a great deal of bandwidth, even while remaining within their QoS parameters.

Network-based application recognition (NBAR), a feature of Cisco Systems' proprietary IOS software, has been used to reduce traffic rates related to file sharing applications. NBAR is a classification engine that can recognize a wide variety of applications, including Web-based applications and client/server applications (such as file-sharing applications), by detecting patterns at Layer 4 and above. Once the application is recognized, the network can invoke specific actions relating to the recognized application. For example, NBAR can be used to trigger changes in priority, QoS, etc.

However, programmers of file sharing applications are aware of NBAR's capabilities and keep altering file-sharing software to avoid detection. For example, the most recent release of KaZaA includes a "port-hopping" feature that makes detection with NBAR difficult or impossible.

It would be very useful to have more reliable methods for detecting when file-sharing applications, or other applications which consume disproportionate amounts of network bandwidth, are being used. Moreover, it would be useful to prevent or reduce such bandwidth consumption.

SUMMARY OF THE INVENTION

Methods and devices are provided for regulating traffic on a network. When excessive bandwidth usage is detected, some aspects of the invention provide methods for automatically modifying a customer's quality of service, priority, or other service attributes. In some implementations, a set of rules for governing bandwidth usage is defined, the rules corresponding to properties of a token bucket.

According to some aspects of the invention, if a subscriber's upstream traffic exceeds a predetermined level over a first period of time, the subscriber's quality of service is adjusted without requiring the subscriber to re-register. According to some embodiments, a first token bucket is used to determine whether the subscriber's upstream traffic exceeds the predetermined level over the first period of time. In some such embodiments, the first token bucket is used to control the burst size, peak rate, or other properties of another token bucket, depending on the subscriber's upstream traffic during the first period of time.

According to other aspects of the invention, a warning may be sent to customers who are consuming too much bandwidth. According to still other aspects of the invention, customers who are consuming too much bandwidth can be charged a higher rate for service.

According to some implementations of the invention, a method is provided for controlling bandwidth utilization of a network subscriber. This method and all other methods described herein may be implemented in computer software and/or hardware. The method includes the following steps: regulating bursty traffic by using a token bucket having a capacity for a plurality of tokens, each token authorizing the network subscriber to transmit a unit of data, the tokens being added to the token bucket at a rate that equals the capacity divided by a first time period; calculating a number of excess tokens that are not retained in the token bucket because the token bucket has reached the capacity; and controlling bandwidth utilization of the network subscriber based in part on a calculated number of excess tokens during a second time period greater than the first time period.

The first time period may be less than one second. The second time period may be at least one hundred times greater than the first time period.

The controlling step may involve changing the network subscriber's quality of service, changing the network subscriber's priority of service and/or sending a message to the network subscriber. The method may also include the step of calculating the network subscriber's bill based in part on the number of excess tokens.

According to alternative implementation of the invention, a method of controlling bandwidth utilization of a network subscriber is provided. The method includes the following steps: regulating bursty traffic by using a first token bucket having a first capacity B1 for first tokens, each first token authorizing the network subscriber to transmit a unit of data, the first tokens added to the token bucket at a rate R1 that equals the first capacity B1 divided by a first time period T1; and controlling the first token bucket by using a second token bucket having a second capacity B2 for second tokens added to the second token bucket at a second rate R2 that equals the second capacity B2 divided by a second time period T2 greater than T1.

T1 may be less than one second. T2 may be at least one minute. B2 may be at least 100 times greater than B1.

The controlling step may involve changing the first capacity, changing the network subscriber's priority of service and/or sending a message to the network subscriber.

Another method of controlling bandwidth utilization of a network subscriber is provided by the invention. This method includes the following steps: regulating bursty traffic by using a first token bucket having a first capacity B1 for first tokens, each first token authorizing the network subscriber to transmit a first unit of data; and controlling the first token bucket by using a second token bucket having a second capacity B2 for second tokens, each second token authorizing the network subscriber to transmit a second unit of data, the second unit of data being at least 100 times greater than the first unit of data.

Yet another method of controlling bandwidth utilization of a cable network subscriber is provided by the invention. This method includes: monitoring the cable network subscriber's upstream transmissions during a predetermined time period; and reducing the cable network subscriber's quality of service while the cable network subscriber is logged on if the cable network subscriber transmits more than a predetermined quantity of data during the predetermined time period.

Some embodiments of the invention provide an apparatus for controlling bandwidth utilization of a network subscriber. The apparatus is configured to do the following: regulate bursty traffic by using a token bucket having a capacity for a plurality of tokens, each token authorizing the network subscriber to transmit a unit of data, the tokens being added to the token bucket at a rate that equals the capacity divided by a first time period; calculate a number of excess tokens that are not retained in the token bucket because the token bucket has reached the capacity; and control bandwidth utilization of the network subscriber based in part on a calculated number of excess tokens during a second time period greater than the first time period.

The apparatus may include a cable modem termination system. The apparatus may include a line card.

Other embodiments of the invention provide an apparatus for controlling bandwidth utilization of a network subscriber, comprising: a device for regulating bursty traffic by using a first token bucket having a first capacity B1 for first tokens, each first token authorizing the network subscriber to transmit a unit of data, the first tokens added to the token bucket at a rate R1 that equals the first capacity B1 divided by a first time period T1; and a device for controlling the first token bucket by using a second token bucket having a second capacity B2 for second tokens added to the second token bucket at a second rate R2 that equals the second capacity B2 divided by a second time period T2 greater than T1.

Still other embodiments of the present invention provide an apparatus for controlling bandwidth utilization of a network subscriber, the apparatus configured to do the following: regulate bursty traffic by using a first token bucket having a first capacity B1 for first tokens, each first token authorizing the network subscriber to transmit a first unit of data; and control the first token bucket by using a second token bucket having a second capacity B2 for second tokens, each second token authorizing the network subscriber to transmit a second unit of data, the second unit of data being at least 100 times greater than the first unit of data.

Some embodiments of the invention include an apparatus for controlling bandwidth utilization of a cable network subscriber. The apparatus is configured to do the following: monitor the cable network subscriber's upstream transmissions during a predetermined time period; and reduce the cable network subscriber's quality of service while the cable network subscriber is logged on if the cable network subscriber transmits more than a predetermined quantity of data during the predetermined time period.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Generally, the methods of the present invention may be implemented on software and/or hardware. For example, the invention can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device such as a terminal designed to handle network traffic between the terminal and a plurality of network nodes. Such network devices typically have multiple network interfaces.

Although the methods of the present invention may be implemented on various types of networks, the following description will focus primarily on cable networks. One important class of device that may be used to implement the present invention in a cable network is the cable modem termination system (CMTS). Preferably, the CMTS is a "routing" CMTS, which handles at least some routing functions. Alternatively, the CMTS may be a "bridging" CMTS, which handles only lower-level tasks.

Figure 1:
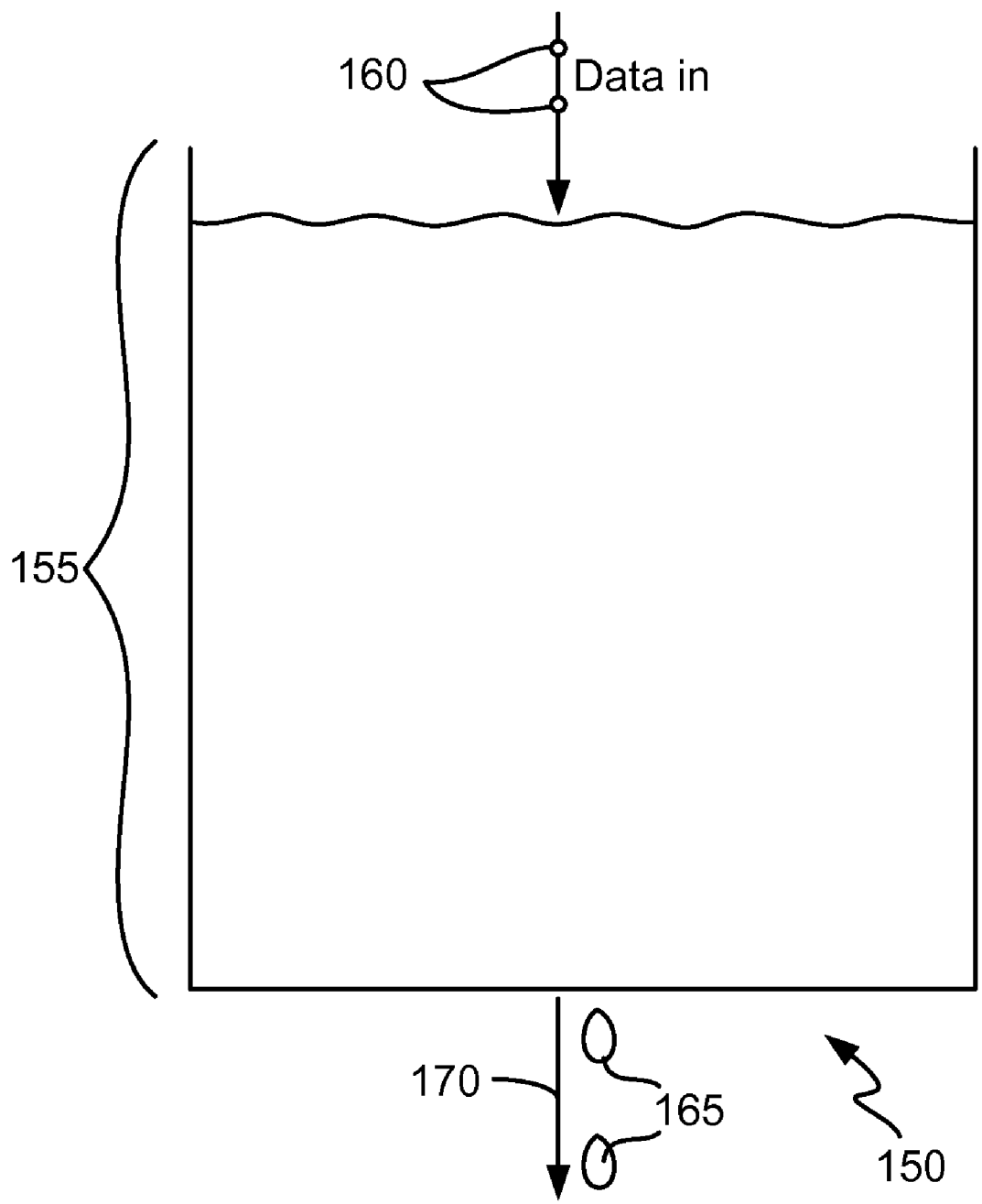
FIG. 1 is a block diagram that illustrates a leaky bucket.
Figure 1A:
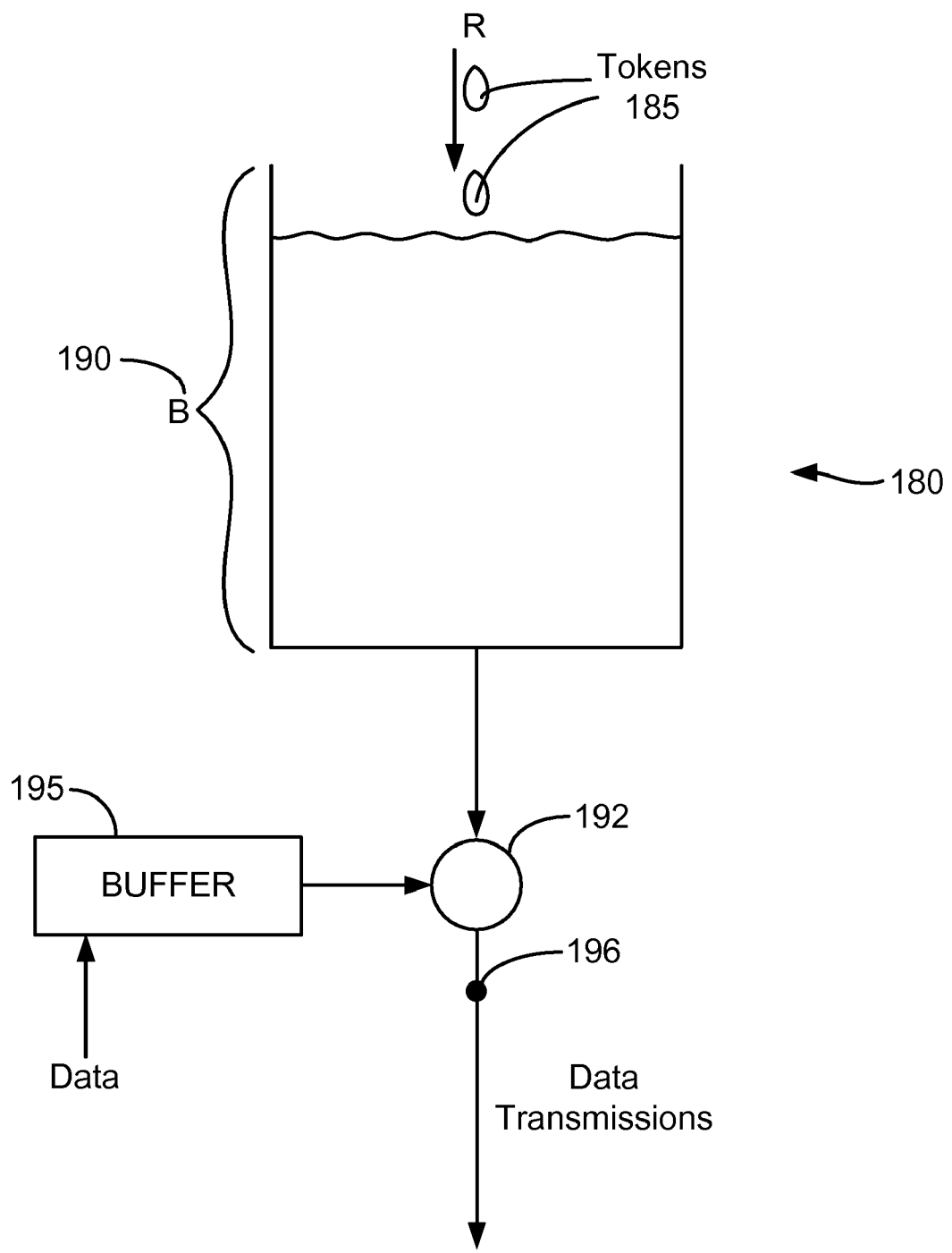
FIG. 1A illustrates the operation of a token bucket.
Figure 1B:
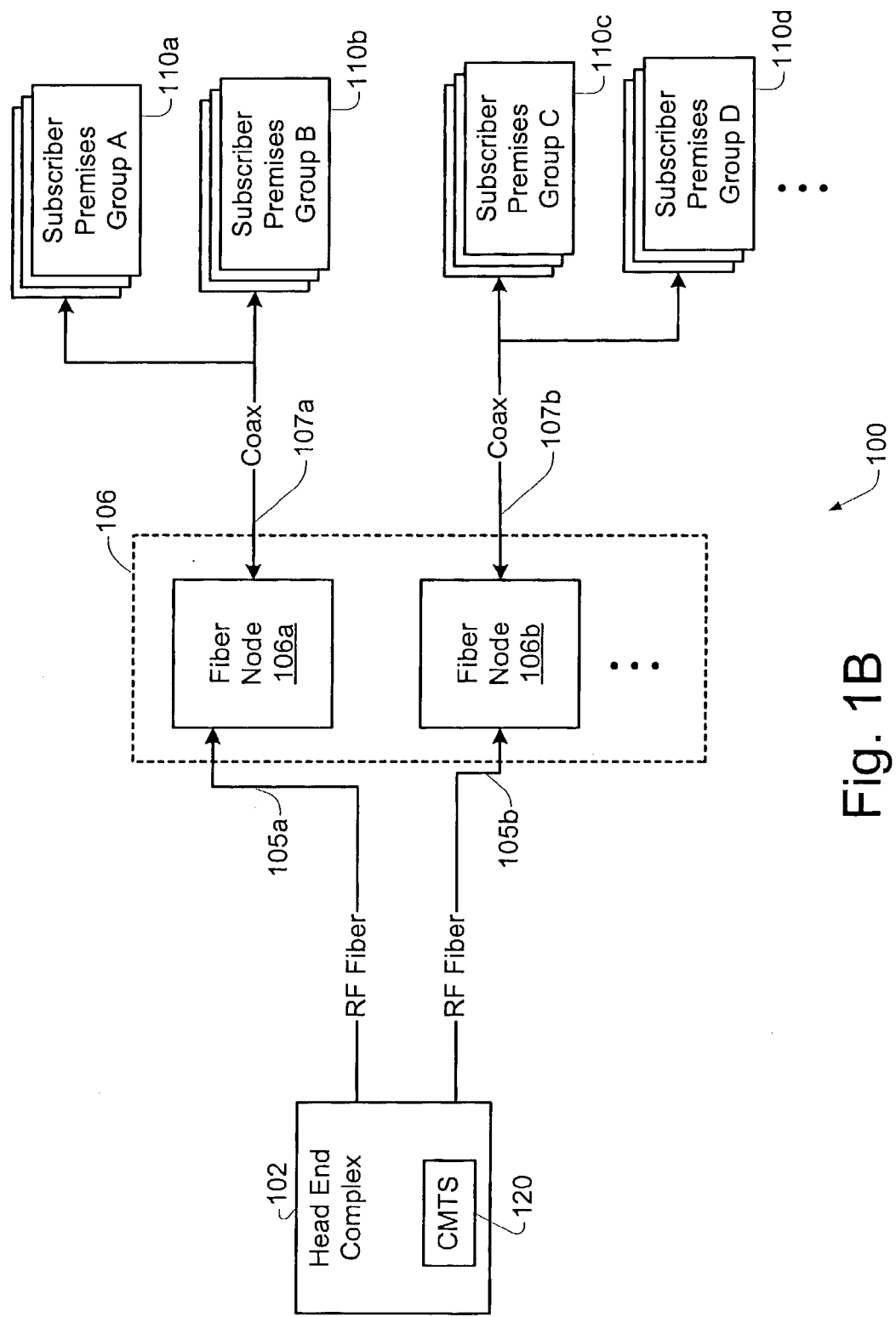
FIG. 1B is a block diagram that illustrates a two-way hybrid fiber-coaxial network.

FIG. 1B shows a block diagram of a two-way hybrid fiber-coaxial (HFC) cable network 100. As shown in FIG. 1, the cable network 100 includes a head end complex 102, which is typically configured to service about 40,000 homes. The head end complex 102 may include a plurality of components and/or systems (not shown) such as, for example, a head end, a super head end, a hub, a primary hub, a second hub, etc. Additionally, as shown in FIG. 1B, the head end complex 102 includes a CMTS 120. Primary functions of the CMTS 120 include: (1) receiving data inputs from external sources 100 and converting the data for transmission over the cable plant; (2) providing appropriate Media Access Control (MAC) level packet headers for data received by the cable system; and (3) modulating and demodulating the data to and from the cable network. In some embodiments of the invention, CMTS 120 implements the methods of the present invention. Typically, the head end complex 102 is configured to provide a communication interface between nodes (e.g. cable modems) in the cable network and external networks such as, for example, the Internet. The cable modems typically reside at the subscriber premises 110A-D.

In this embodiment, head end complex 102 is connected to one or more fiber nodes 106 in the cable network. Each fiber node is, in turn, configured to service one or more subscriber groups 110. Each subscriber group typically comprises about 500 to 2000 households. A primary function of the fiber nodes 106 is to provide an optical-electronic signal interface between the head end complex 102 and the plurality of cable modems residing at the plurality of subscriber groups 110.

In order for data to be able to be transmitted effectively over a wide area network such as HFC or other broadband computer networks, network providers typically adopt a common standard for data transmission. A commonly used and well-known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, DOCSIS 1.1 RF Interface Specification (document control number SP-RFIv1.1-I06-001215, Dec. 15, 2000). That document is incorporated herein by reference for all purposes. More recent releases of DOCSIS are now in use and the present invention may be implemented on any such version. However, the present invention is not limited to data transmissions that use the DOCSIS standard. Any convenient standard may be used, depending upon various factors, including the type of data network used to implement the present invention.

Communication between head end complex 102 and fiber node 106a is implemented using modulated optical signals that travel over fiber optic cables. More specifically, during the transmission of modulated optical signals, multiple optical frequencies are modulated with data and transmitted over optical fibers such as, for example, optical fiber links 105a and 105b of FIG. 1, which are typically referred to as "RF fibers". As shown in FIG. 1, the modulated optical signals transmitted from the head end complex 102 eventually terminate at the fiber node 106a. The fiber nodes maintain the signal modulation while converting from the fiber media to the coax media and back.

Each of the fiber nodes 106 is connected by a coaxial cable 107 to a respective group of cable modems residing at subscriber premises 110A-D. According to the DOCSIS standard, specific frequency ranges are used for transmitting downstream information from the CMTS to the cable modems, and other specific frequency ranges are used for transmitting upstream information from the cable modems to the CMTS.

In order to allow the cable modems to transmit data to the CMTS, the cable modems share one or more upstream channels within that domain. Access to the upstream channel is normally controlled using a time division multiplexing (TDM) approach. Such an implementation requires that the CMTS and all cable modems sharing an upstream channel within a particular domain have a common concept of time so that when the CMTS tells a particular cable modem to transmit data at time T, the cable modem understands what to do. "Time" in this context may be tracked using a counter, commonly referred to as a timestamp counter, which, according to conventional implementations is a 32-bit counter that increments by one every clock pulse.

In this embodiment, digital data on upstream and downstream channels of the cable network are carried over radio frequency ("RF") carrier signals. Cable modems convert digital data to a modulated RF signal for upstream transmission and convert downstream RF signal to digital form. The conversion is done at a subscriber's facility. At a CMTS, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data are fed to the cable modem (from an associated PC, for example), which converts it to a modulated RF signal. Once the CMTS receives the upstream RF signal, it demodulates the signal and transmits the digital data to an external source.

Figure 2:
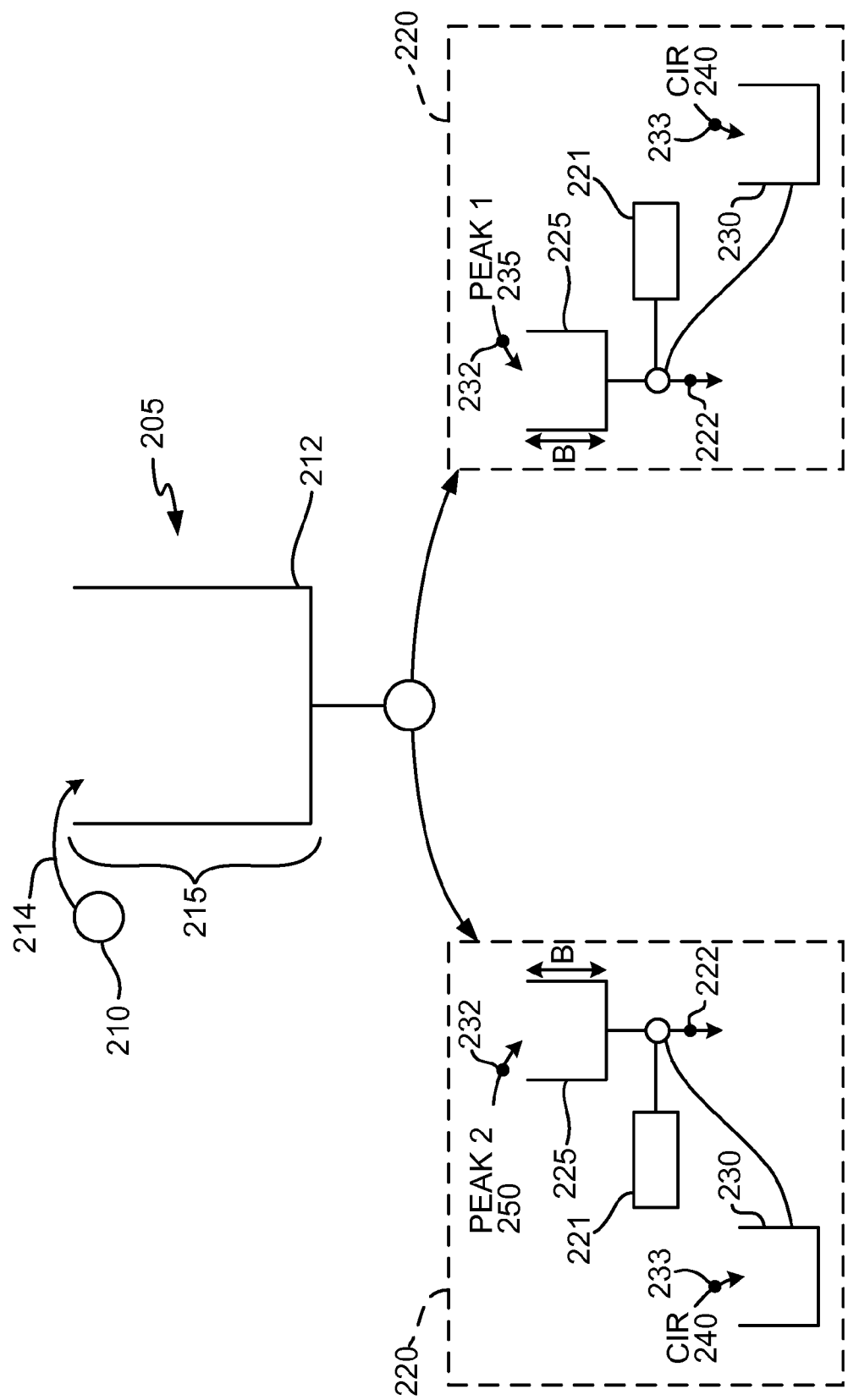
FIG. 2 is a schematic diagram that illustrates a method for regulating network traffic according to some aspects of the invention.

FIG. 2 is a schematic diagram that illustrates some implementations of the invention. Regulator 205 monitors a subscriber's bandwidth usage and controls the subscriber's service attributes when appropriate. Regulator 205 may be used to monitor, for example, upstream transmissions from a subscriber's cable modem. When regulator 205 determines that a subscriber is using too much bandwidth over a predetermined time (which may be, for example, on the order of minutes, hours or days), regulator 205 can automatically modify the subscriber's quality of service, priority, or other service attributes. In the context of a cable network, "automatically" may mean, for example, that the subscriber's service attributes can be modified without requiring the subscriber to re-register (i.e., while the subscriber is logged on).

Regulator 205 controls device 220, which is used to shape network traffic by controlling bursts, etc. In this example, device 220 includes at least one token bucket for regulating bursty traffic. Here, device 220 includes token buckets 225 and 230, which are configured in a manner similar to that described in Network Working Group's Request for Comments 2698 (September 1999), which is hereby incorporated by reference. However, the configuration of device 220 is merely exemplary. Any convenient device known in the art for shaping network traffic may be used.

Tokens 232 flow into token bucket 225 at first peak rate 235 per second and tokens flow into token bucket 230 at a committed rate 240 per second. The size of tokens 232 and 240 can vary, but are normally 1 bit or 1 byte. For example, in one implementation, if the peak rate 235 is 256 Kb/sec, a 1-bit token flows into the bucket every 3 microseconds. In other implementations, tokens do not flow continuously into the token buckets. Instead, a number of tokens is calculated at the time packets arrive in a transmit queue, depending on the peak rate and the amount of time that has elapsed since the last arrival.

First peak rate 235 may be any peak rate associated with a subscriber (and generally defined by a subscriber service agreement). In one example, first peak rate 235 is 1 megabit per second (Mb/s). Committed rate 240 defines a guaranteed minimum level of service. For most subscribers, committed rate 240 may be set to zero, because no guaranteed level of service is provided. Accordingly, in this example, committed rate 240 is zero.

Token bucket 225 has a capacity or burst size B that determines the maximum burst size for data 222 transmitted by the subscriber. Burst size B may be set to any convenient size. In one embodiment, B is 12 kilobits. As is known to those of skill in the art, token bucket 225 would typically fill to burst size B in one second or less if the subscriber were to transmit no data during that time. Data 222 are stored in buffer 221 prior to transmission.

If regulator 205 determines that a subscriber is consuming too much bandwidth over a predetermined time, regulator 205 can take various actions. For example, regulator 205 can automatically modify the subscriber's quality of service, priority, or other service attributes. Alternatively, regulator 205 could cause a message to be sent to the subscriber (e.g., warning about the consequences of continued excessive bandwidth usage), cause a payment required from the subscriber to be increased, or take other actions determined by the service provider. In this example, if regulator 205 determines that the subscriber is consuming too much bandwidth, regulator 205 automatically causes first peak rate 235 to be reduced to second peak rate 250, which is 500 Kb/s in this example.

In the example depicted in FIG. 2, regulator 205 includes a novel type of token bucket, referred to herein as a giant token bucket or GTB. Here, tokens 210 flow into GTB 212 at rate 214, which is a much slower rate than any of rates 235, 240 or 250. In general, rate 214 is at least one order of magnitude slower and may be several orders of magnitude slower. Preferably, the time interval corresponding to rate 214 is at least 100 times greater than the time interval corresponding to any of rates 235, 240 or 250. In one example, a single token 210 flows into GTB 212 every 30 minutes. However, rate 214 may be any convenient rate. Preferably, rate 214 is selected by a service provider to provide a desired level of monitoring granularity.

The size of token 210 is set to a desired maximum amount of data that a subscriber is permitted to transmit during the chosen time period. Token 210 is preferably at least 100 times larger than either of tokens 232 or 233, and may be many orders of magnitude larger. For example, if token 210 were 10 Megabytes (MB) and one token flowed into GTB 212 every 30 minutes, the subscriber would be able to transmit up to 10 MB each half hour without triggering a response by regulator 205.

However, the time interval corresponding to rate 214 is not necessarily the same time interval for triggering a response by regulator 205. In one example, token 210 has a size of 10 MB and one token 210 flows into GTB 212 every 15 minutes. Regulator 205 may be programmed to take action only if a subscriber's upstream traffic exceeds 10 MB for a predetermined number of 15-minute intervals within a certain period. For example, regulator 205 could automatically downgrade one or more of the subscriber's service attributes (e.g., QoS) if a customer's upstream traffic exceeded 10 MB during more than three 15-minute intervals within an hour, during more than ten 15-minute intervals within a day, etc.

In other examples, regulator 205 determines whether to take action based on a sliding window of multiple days D, e.g., over a rolling one-week or 30-day period. If a subscriber exceeds his usage parameters more than a certain number E of days within the last range of days D (e.g., 4 out of 7 or 20 out of 30), regulator 205 initiates a predetermined action.

In alternative embodiments, such excessive bandwidth usage could trigger a different type of response. For example, regulator 205 could cause a message (such as a warning e-mail) to be sent to the subscriber. Alternatively, regulator 205 could cause the subscriber's bill to increase, e.g., to a level commensurate with the subscriber's bandwidth usage. Moreover, if a subscriber transmitted less than a certain amount of data during a predetermined time (or during predetermined times), the subscriber's "good" behavior could be rewarded by a reduced bill, an upgrade in service attributes, etc.

According to other aspects of the invention, regulator 205 determines how many excess tokens are not retained in token bucket 225 or 230 because the token bucket has reached its capacity. When excess tokens are discarded, this means that a subscriber is not transmitting as much data as the subscriber could transmit. This determination could be made during one or more time intervals, as described above, and could trigger similar responses by regulator 205 for controlling the subscriber's bandwidth utilization, controlling charges for the subscriber's service, etc.

In alternative embodiments, the configuration of regulator 205 may be analogous to the token buckets described in Request for Comments ("RFC") 2697, "A Single Rate Three Color Marker" or RFC 2698, "A Two Rate Three Color Marker."

Figure 3A:
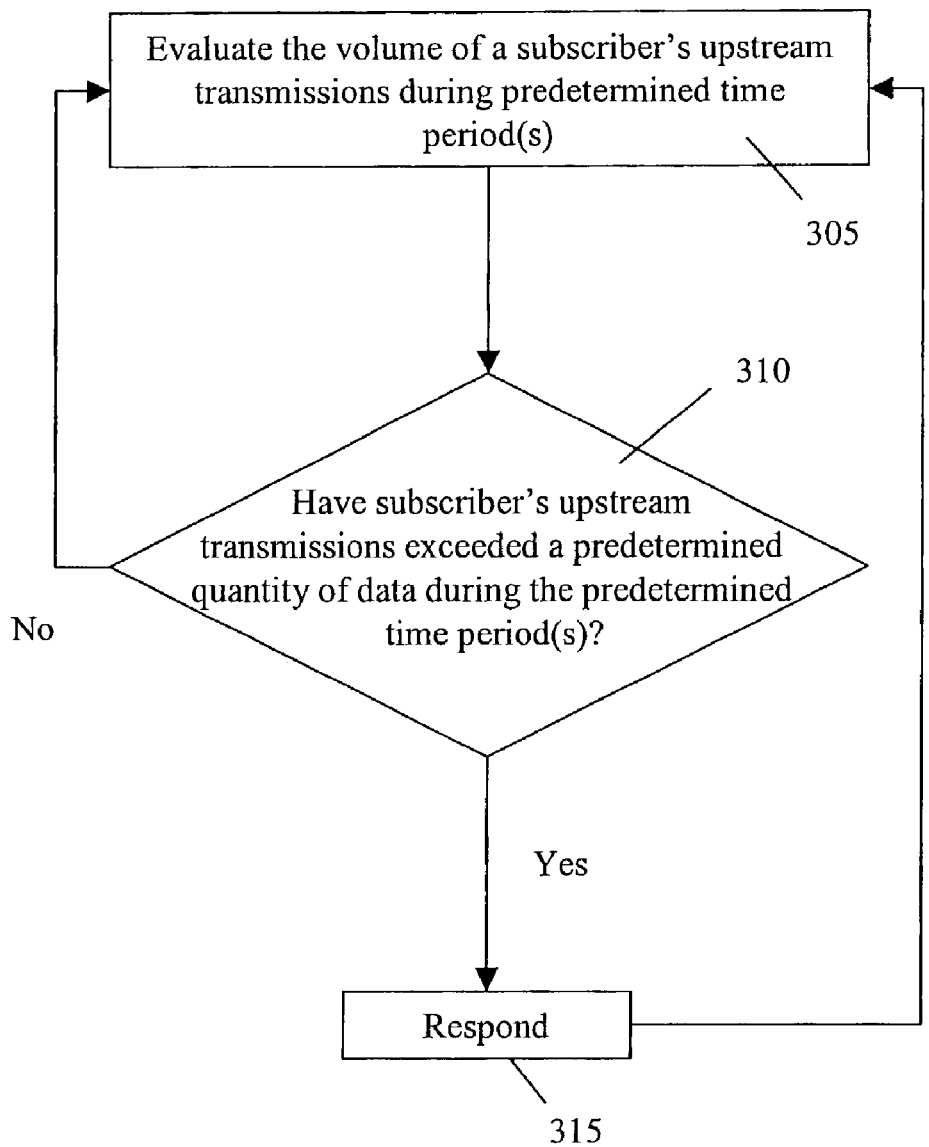
FIG. 3A is a flow chart that describes a method of controlling a subscriber's bandwidth usage according to some aspects of the invention.

FIG. 3A is a flow chart that illustrates some aspects of the present invention in general terms. In step 305, the volume of a subscriber's upstream transmissions is evaluated during a predetermined time or during a series of predetermined times. This evaluating step could be performed in any of the ways described above with reference to FIG. 2, or in any other convenient way. For example, step 305 may involve the use of regulator 205 in the form of GTB 212. The amount of data transmitted by the subscriber could be evaluated each time a token 210 flows into GTB 212 (e.g., every 20 minutes). This evaluation could be made by comparing the number of bytes of data transmitted by the subscriber during the previous 20 minutes with the size of token 210. If token 210 is a 5 MB token, step 305 includes the step of determining whether the subscriber has transmitted more than 5 MB during the last 20 minutes.

In step 310, it is determined whether the subscriber's upstream transmissions have exceeded a predetermined quantity of data during the predetermined time period(s). As described above, the time periods for evaluating the subscriber's transmission volume may not be the same as the time frame during which the determination of step 310 is made. Using the foregoing example, wherein it is determined in step 305 if the subscriber has transmitted more than 5 MB during the last 20 minutes, step 310 could involve determining whether the subscriber exceeded this 5-MB limit more than a predetermined number of times during a predetermined period longer than 20 minutes, e.g., twice during an hour or 10 times during a day.

If it is determined in step 310 that the subscriber's upstream transmissions have exceeded a predetermined quantity of data during the predetermined time period(s), a response is triggered in step 315. If not, the evaluation of step 305 continues. The responses could include any described above with reference to FIG. 2, or any other response that the service provider deems appropriate. Preferably, the evaluation of step 305 continues in order to determine whether the response of step 315 should be repeated, extended, etc. For example, if the response of step 315 is to downgrade a subscriber's QoS, continued evaluation in step 305 could determine how long the QoS should be downgraded and/or whether further action should be taken.

Figure 3B:
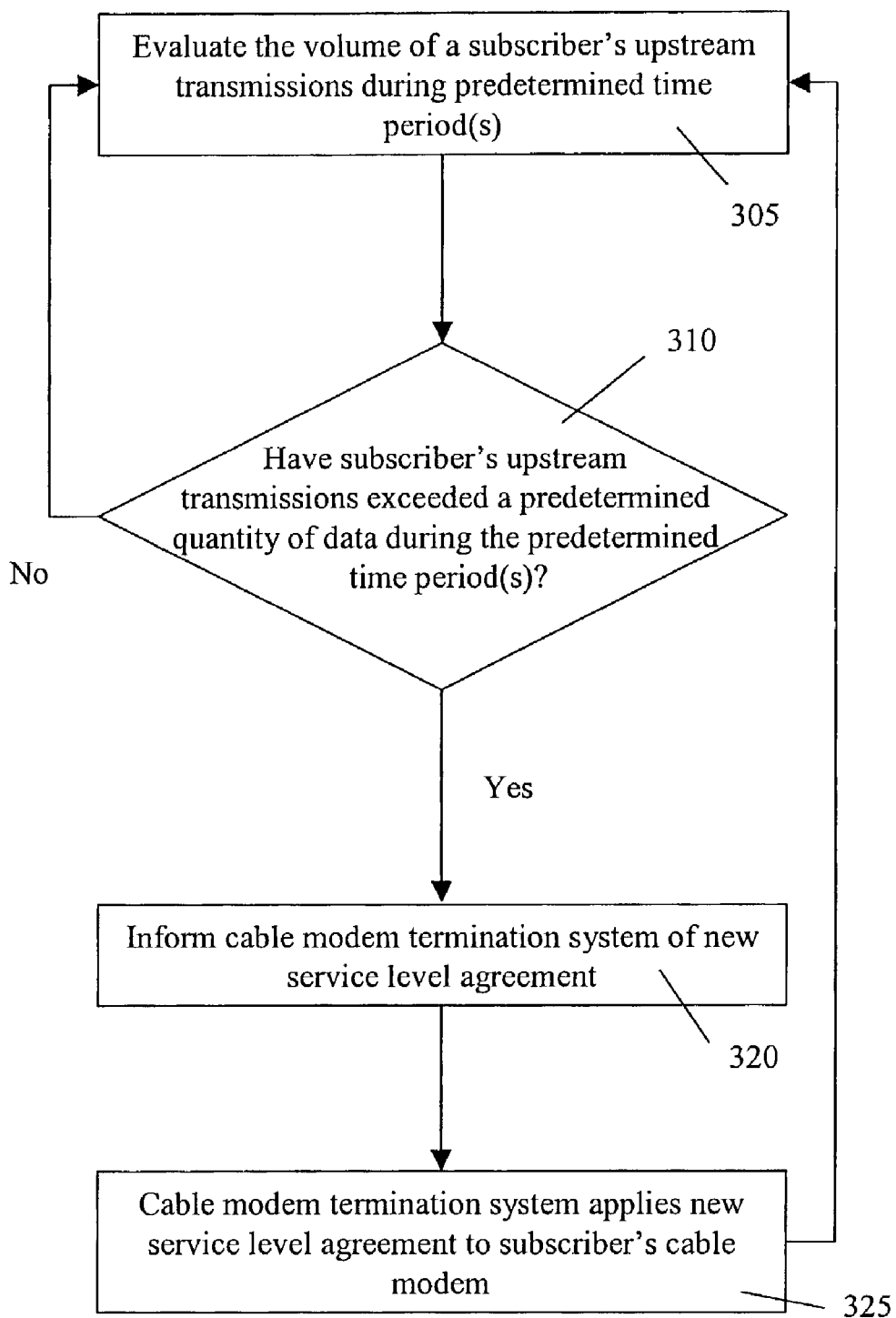
FIG. 3B is a flow chart that describes a method of changing a subscriber's service parameter without requiring the subscriber to re-register according to some aspects of the invention.

FIG. 3B illustrates step 315 according to one aspect of the invention. Here, step 315 includes altering a cable network subscriber's service attributes without requiring the subscriber to re-register (i.e., while the subscriber is logged on).

The DOCSIS protocol allows a CMTS to control the rate in which bandwidth requests from the modems are served, by either dropping the bandwidth requests or delaying them (by means of sending "pending grants"). Furthermore, in DOCSIS 1.0 the modem is not supposed to rate limit upstream traffic at all. Instead, it is assumed that the CMTS is solely responsible for enforcing service level agreements (SLAs). Typically, the CMTS learns about these SLAs from a cable modem configuration file that is obtained each time a subscriber logs on and registers.

Normally, changing a subscriber's upstream SLA requires a subscriber to go through the process of registration, which involves requesting a reconfiguration file from the provisioning server. Accordingly, when the cable modem re-registers, the provisioning server will pick a new configuration file with a new SLA. This process could result in a momentary loss of traffic, because the modem is not allowed to pass user data while it is registering.

However, since a CMTS controls upstream traffic, there is no need to register a modem in order to enforce SLAs. Accordingly, step 320 triggers an alteration of a cable network subscriber's service attributes by informing a CMTS of a new SLA in which, for example, the subscriber's QoS has been downgraded. The CMTS can be informed of the new SLA by any means (e.g., via Simple Network Management Protocol ("SNMP"), command-line interface ("CLI"), a dynamic algorithm, etc.).

In step 320, the CMTS applies the new SLA directly to the subscriber's modem. Preferably, the CMTS keeps track of cable modems to which new SLAs have been applied in this way, so that even when the modem does re-register, the CMTS will override the SLA received from registration by the SLA enforced directly at the CMTS. Accordingly, if the subscriber re-registers as a result of network outage or a CM outage (for example, turning off the power switch on the CM), the new SLA will continue to apply until it is determined that the new SLA should be altered (e.g., by subsequent compliance by the subscriber).

Alternative Hardware Configurations

Figure 4:
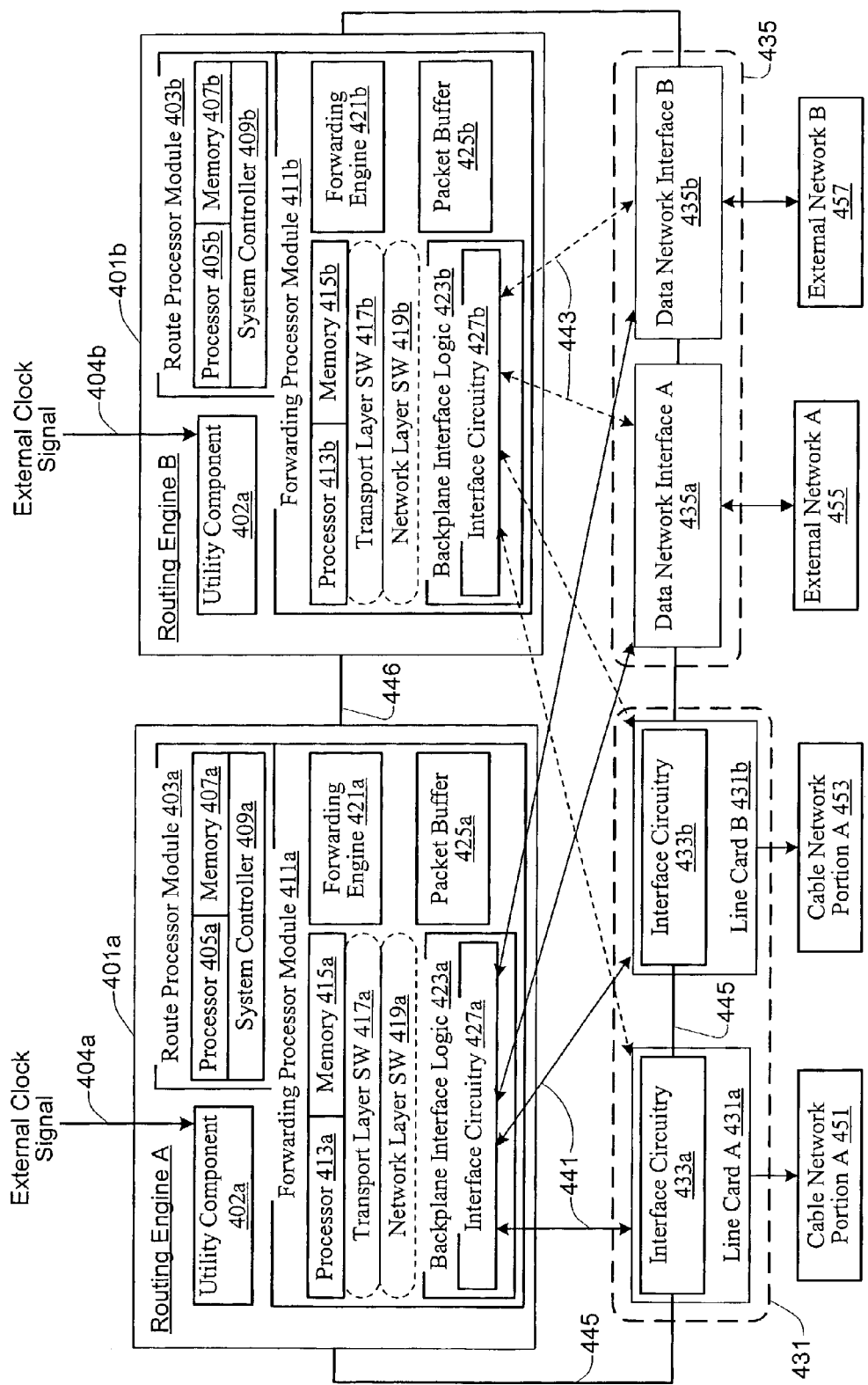
FIG. 4 is a block diagram that illustrates one embodiment of a cable modem termination system.

Various configurations for implementing the invention will be described below with reference to FIGS. 4 through 8. FIG. 4 shows a block diagram of a specific embodiment of CMTS 400 that may be used to implement certain aspects of the present invention. As shown in FIG. 4, the CMTS 400 may comprise a plurality of routing engines (e.g., 401a and 401b). In a specific implementation, Routing Engine A (401a) may be configured as a primary or working routing engine, while Routing Engine B (401b) may be configured as a backup or standby routing engine that provides redundancy functionality.

As shown in the embodiment of FIG. 4, each of the routing engines may include a variety of similar modules and/or components. In order to avoid confusion, the various components and/or modules relating to Routing Engine A (401a) will now be described in greater detail, with the understanding that such descriptions may also be applied to the corresponding components and modules of Routing Engine B (401b).

According to a specific embodiment, Routing Engine A may be configured or designed to include a plurality of functionally different modules or components, including, for example, a Forwarding Processor (FP) Module 411a adapted to provide packet forwarding functionality; a Route Processor (RP) Module 403a adapted to implement routing or forwarding operations; and a utility component 402a adapted to provide system clock and timestamp functionality. The routing engine components may be configured to provide layer one, layer two, layer three and layer four functionality as well as quality of service (QoS) functionality.

According to a specific implementation, the RP Module 403a may be configured as a processor-based routing system comprising functionality incorporated within a typical router, such as, for example, any of specially configured router models 1600, 2500, 2600, 3600, 4500, 4700, 7200, 7500, 10012, and 12000 available from Cisco Systems, Inc. of San Jose, Calif. For example, as shown in the embodiment of FIG. 4, the RP Module 403a includes a general-purpose processor 405a (e.g., a MIPS route processor) coupled to a system controller 409a and memory 407a.

It should be noted that components have been described in singular form for clarity. One skilled in the art would appreciate that multiple processors, a variety of memory formats, or multiple system controllers, for example, can be used in this context as well as in other contexts while falling within the scope of the present invention. The memory 407a may comprise synchronous dynamic random access memory (SDRAM) storage locations addressable by the processor 405a for storing software programs and data structures accessed by the components. A network routing operating system, portions of which may reside in memory and executed by the route processor, functionally organizes the router by invoking network operations in support of software processes executing on the router.

The RP processor 405a may be configured to construct and load routing tables used by the FP Module 411a. The processor 405a may also be configured or designed to perform configuration management functions of the routing engine 401a, and to communicate with neighboring peer, standby, and/or backup routers to exchange protocol data units used to construct the routing tables in accordance with conventional routing algorithms. It will be apparent to those skilled in the art that other memory types, including various computer readable media, may be used for storing and executing program instructions pertaining to the operation of the routing engine.

Interface circuitry 427a may be coupled to the respective interface circuitry 433a, 433b of line cards 431a, 431b. According to a specific implementation, interface circuitry 427a may be configured to reside on a backplane logic circuit 423a of the routing engine. In one example, the backplane logic circuit 423a is embodied as a high performance, application specific integrated circuit (ASIC). An example of a backplane logic circuit that may be advantageously used with the present invention is disclosed in co-pending and commonly owned U.S. patent application Ser. No. 09/791,063, filed on Feb. 22, 2001, the entirety of which is hereby incorporated by reference for all purposes.

According to a specific embodiment, the backplane logic circuit (which, according to a specific implementation, may be configured as an ASIC) may be configured to further interface the line cards to a packet buffer 425a and a forwarding engine 421a of the FP Module 411a. The packet buffer 425a may include memory that is configured to store packets as the forwarding engine 421a performs its packet forwarding functions. For example, the packet buffer may be used to store low priority data packets while high priority, low latency voice packets are forwarded by the forwarding engine to a data network interface 435a. According to various embodiments, the FP Module 411 may comprise a processor 413a and memory 415a for handling transport layer 417 and network layer 419 functionality. In one implementation, the processor 413a may be configured to track accounting, port, and billing information for various users on a cable modem network 451. The processor 413a may also be configured to maintain desired service flow or session state information in memory 415a such as, for example, for voice calls initiated over the cable modem network. The FP Module 411a may also be configured to provide transaction compacting functionality, data parcel tunneling functionality, switching functionality, log-in monitoring functionality as described above, etc.

According to a specific implementation, Routing Engine A 401a may be connected to Routing Engine B 401b via at least one link 446, such as, for example, a backplane line or system bus. Routing engine redundancy may be provided by designating one of the routing engines as the working or primary routing engine and designating the other routing engine(s) as the redundant or standby routing engine(s). When configured as a working routing engine, the Routing Engine A may perform all appropriate forwarding and routing functions. When a failure occurs at the working routing engine, the redundant routing engine (e.g. Routing Engine B) may then take over the operations of the working routing engine. Thereafter, when Routing Engine A recovers, it may assume the functions of the redundant routing engine, or it may take over the functions of the working routing engine.

According to different embodiments of the present invention, one or more of the routing engines may be configured to communicate with a plurality of line cards (e.g. 431 and 435) via point-to-point links. For example, as shown in FIG. 4, each of the plurality of line cards 431 and 435 are connected to each of the routing engines 401a, 401b via point-to-point links 441 and 443. One advantage of the point-to-point link configuration is that it provides additional reliability in that the failure of one or more line cards will not interfere with communications between other line cards and the routing engine(s). For example, if Line Card A 431a suddenly failed, each of the routing engines would still be able to communicate with the other line cards.

According to a specific embodiment, the plurality of line cards may include different types of line cards that have been specifically configured to perform specific functions. For example, line cards 431 may correspond to radio-frequency (RF) line cards that have been configured or designed for use in a cable network. Additionally, line cards 435 may correspond to network interface cards that have been configured or designed to interface with different types of external networks (e.g. WANs and/or LANs) utilizing different types of communication protocols (e.g. Ethernet, Frame Relay, ATM, TCP/IP, etc). For example, the data network interface 435a functions as an interface component between external data sources and the cable system. The external data sources transmit data to the data network interface 435a via, for example, optical fiber, microwave link, satellite link, or through various media. A data network interface may include hardware and software for interfacing to various networks. According to various embodiments, a data network interface may be implemented on a line card as part of a conventional router for a packet-switched network. Using this type of configuration, the CMTS is able to send and/or receive IP packets to and from the data network interface using, for example, network layer software 419a.

According to a specific implementation, the network layer software may implement the operations associated with obtaining an IP address for cable modems. This may involve the CMTS communicating with a DHCP server (not shown) via a data network interface, for example.

As shown in FIG. 4, at least a portion of the line cards includes interface circuitry for providing an appropriate interface between the host line card, other line cards, and/or the routing engine(s). For example, interface circuitry 433a may include interconnect ports coupled to one or more of the point-to-point links 441, 443. According to a specific implementation, the interface circuitry functions as a translator that converts conventional formats of data received at the line cards to a suitable protocol format for transmission from the line card to the appropriate routing engine. In one implementation, the interface circuitry 433a may also include circuitry to perform cyclic redundancy code (CRC) generation and checking on packets, along with interconnect format checking.

According to a specific embodiment, the point-to-point links 441, 443 may be configured as clock forwarded links such that each point-to-point link comprises at least one data wire for transporting data signals and at least one clock wire for carrying clock signals. However, it will be understood to those skilled in the art that the clock forwarding technique may be scaled to accommodate other clock forwarding arrangements such as, for example, connections comprising a plurality or data signals and/or clock signals. Additionally, according to a specific embodiment, each line card may be configured to provide at least one communication interface between the routing engines (401a and 401b) and a portion of the cable network. The data network interface 435a may couple the routing engine 401a to an external data network 455 such as, for example, the Internet.

According to one embodiment, all or selected lines cards, routing engines and/or data network interfaces may be configured to use at least one common dedicated line or backplane (e.g. 445). According to other embodiments, routing engines 401a and 401b may have an additional dedicated connection(s) for supporting redundancy. In a specific implementation, the backplane may be configured as an Ethernet medium that is shared by the CMTS. When the line cards are inserted into the backplane, they communicate with the routing engines over the lines 445 in accordance with a "capabilities" exchange that identifies the types of line cards and their various characteristics/parameters.

According to a specific implementation, during initialization of the CMTS, the routing engines 401a and 401b negotiate for working routing engine status over the backplane. Assertion of working status causes the line cards 431 to configure their respective interface circuitry to communicate with the designated working routing engine (e.g. Routing Engine A 401a). The Routing Engine A 401a then configures the CMTS and line cards, establishes routing relationships, and initiates traffic forwarding operations. The redundant routing engine 401b may complete a self-test and perform initialization of its various functions. The two routing engine assemblies may then exchange conventional negotiation messages (which may include, for example, health and status messages) via the backplane lines 445. According to a specific implementation, the exchanged messages are defined by an Enhanced High System Availability (EHSA) negotiation algorithm available from Cisco Systems, Inc. of San Jose, Calif. The redundant routing engine may also request transaction information from the working routing engine.

When the redundant routing engine 401b detects that the primary routing engine has failed, the redundant routing engine may take over as the new working routing engine, and initiate a "cutover" operation to thereby cause the line card interface circuitry (e.g. 433a and 433b) to identify and communicate with the new working routing engine 401b. The new working routing engine 401b may then access and retrieve state information (such as, for example, telephone call state information, service flow state information, etc.) stored on selected line cards in order to maintain existing service flows.

Prior to a failure situation, the redundant routing engine 401b may be configured to monitor the status of the working routing engine 401a and may further be configured or designed to receive updated configuration, transaction and/or state information, which may then be stored in an appropriate location in the redundant routing engine 401b.

The line cards may further comprise circuitry for "looping" packets back onto the redundant routing engine 401b over the point-to-point links. This allows the redundant routing engine 401b to send and receive test packets to evaluate its own operation in addition to the operation of the dedicated lines prior to the occurrence of a system failure.

The techniques of the present invention may be implemented on various general purpose Cable Modem Termination Systems. In a specific embodiment, the systems of this invention may be specially configured CMTSs such as, for example, specially configured models in the uBR-7200 and uBR-10012 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 4 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 407a, 415a, etc.) configured to store program instructions for the network operations and other functions of the present invention described herein. The program instructions may specify an operating system and one or more applications, for example. Such memory or memories may also be configured to store data structures, configuration states, information regarding log-in attempts, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to: magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Figure 5:
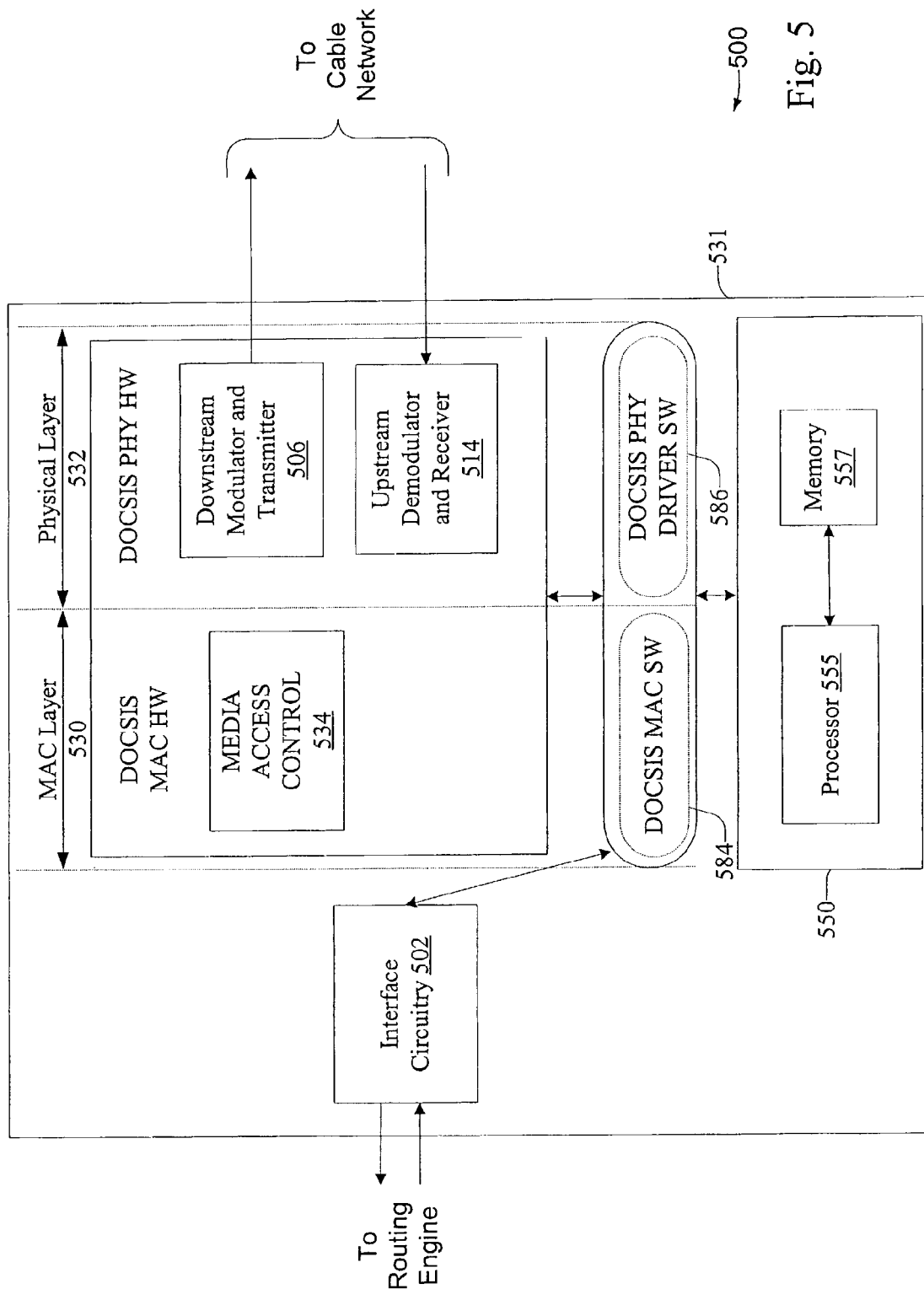
FIG. 5 is a block diagram that illustrates one embodiment of a line card.

FIG. 5 shows a specific embodiment of a line card 500, which may be used for implementing certain aspects of the present invention. According to a specific embodiment, the line card 500 may be configured or designed to implement selected aspects of the DOCSIS functionality that may otherwise be implemented by the CMTS, such as, for example, DOCSIS MAC functionality.

In the specific embodiment as shown in FIG. 5, line card 500 provides functions on several network layers, including a physical layer 532, and a Media Access Control (MAC) layer 530. Generally, the physical layer is responsible for receiving and transmitting RF signals on the cable plant. Hardware portions of the physical layer include at least one downstream modulator and transmitter 506 and/or at least one upstream demodulator and receiver 514. The physical layer also includes software 586 for driving the hardware components of the physical layer.

Upstream optical data signals (packets) arriving via an optical fiber node are converted to electrical signals, and then demodulated by the demodulator/receiver 514. The demodulated information is then passed to MAC layer block 530.

A primary purpose of MAC layer 530 is to encapsulate, with MAC headers, downstream packets and decapsulate, of MAC headers, upstream packets. In some embodiments of the invention, MAC layer 530 of line card 500 implements the methods of the present invention. In one embodiment, the encapsulation and decapsulation proceed as dictated by the above-mentioned DOCSIS standard for transmission of data or other information. The MAC headers include addresses to specific modems (if sent downstream), or to the CMTS (if sent upstream). Note that the cable modems also include MAC addressing components. In the cable modems, these components encapsulate upstream data with a header containing the MAC address of the CMTS.

MAC layer 530 includes a MAC hardware portion 534 and a MAC software portion 584. The MAC layer software portion may include software relating to DOCSIS MAC functionality, etc. The MAC layer hardware and software portions operate together to provide the above-described DOCSIS MAC functionality. In one embodiment, MAC controller 534 is dedicated to performing some MAC layer functions and is distinct from processor 555.

After MAC layer block 530 has processed the upstream information, it is then passed to interface circuitry 502. As described previously, interface circuitry 502 includes the appropriate hardware and/or software for converting data formats received at the line cards to a suitable protocol format for transmission from the line card to an appropriate routing engine.

When a packet is received from the routing engine at the interface circuitry 502, the packet is then passed to MAC layer 530. The MAC layer 530 transmits information via a one-way communication medium to downstream modulator and transmitter 506. Downstream modulator and transmitter 506 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data are likewise modulated using, for example, QAM16 or QSPK. According to a specific embodiment, the modulated data are converted from IF electrical signals to RF electrical signals (or vice-versa) using one or more electrical signal converters (not shown).

As shown in FIG. 5, line card 500 includes a central hardware block 550 including one or more processors 555 and memory 557. These hardware components interact with software and other hardware portions of the various layers within the line card. They provide general purpose computing power for much of the software. Memory 557 may include, for example, I/O memory (e.g. buffers), program memory, shared memory, etc. One or more data structures used for implementing the technique of the present invention may reside in such memory. In one embodiment, the software entities 582, 584, and 586 are implemented as part of a network operating system running on hardware 550. Preferably, at least a part of the functionality of this invention is implemented in software as part of the operating system. In FIG. 5, such software may be part of MAC layer software 584, or may be closely associated therewith. Of course, the logic necessary to implement the methods of the present invention could reside in hardware, software, or some combination of the two.

According to a specific implementation, the procedures typically employed by the CMTS during registration and pre-registration may be performed at the MAC layer of the line card 500. In such an embodiment, most of the registration operations may be performed by the hardware and software provided for MAC layer logic 530.

Figure 6:
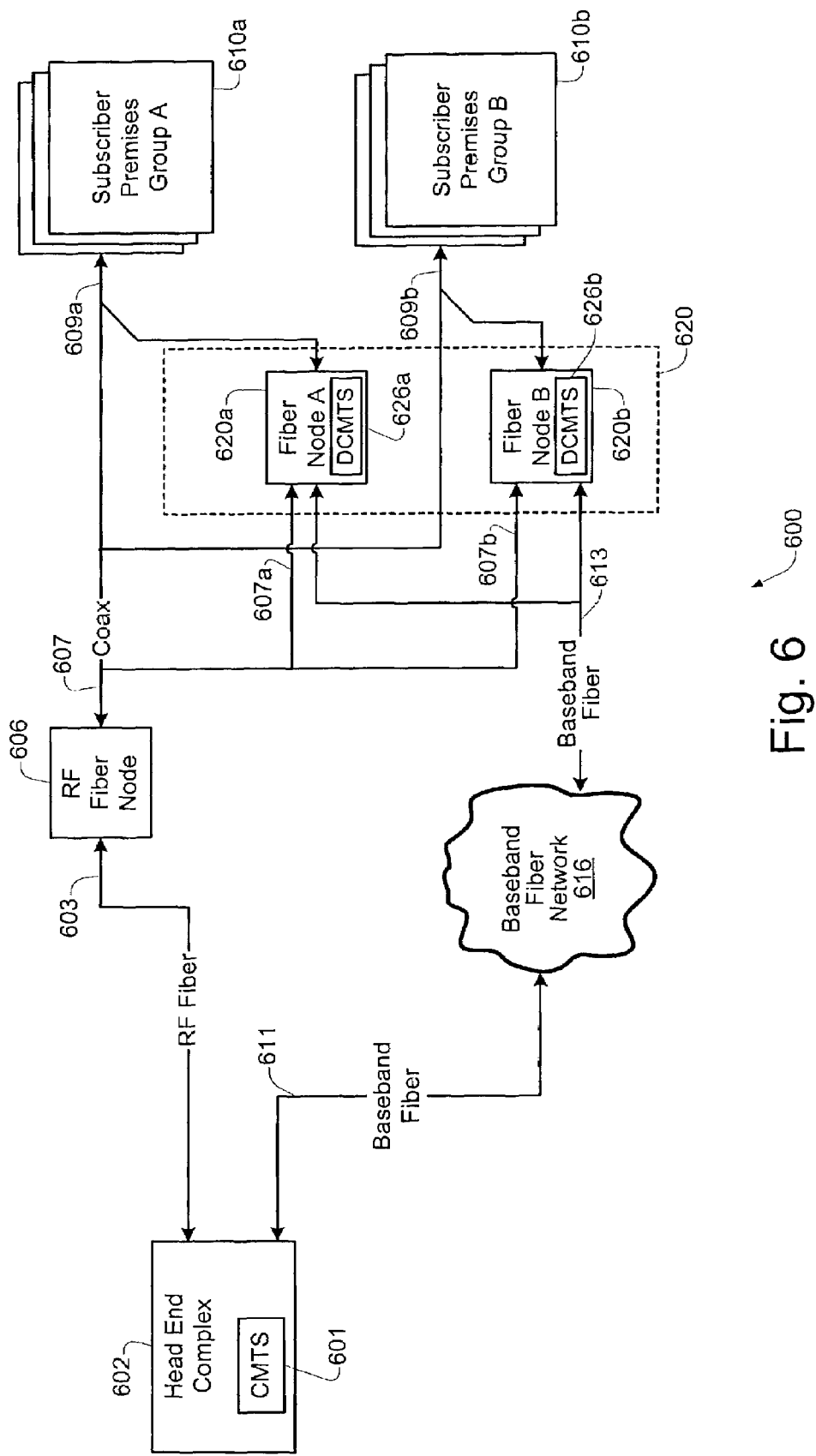
FIG. 6 is a block diagram that illustrates an alternative cable network.

It will be appreciated that, according to a specific embodiments, at least a portion of functions described herein that are performed by the CMTS (e.g. FIG. 4), line cards (e.g. FIG. 5), and/or selected components thereof, may be implemented in a centralized CMTS system (e.g. residing at the head end complex of the cable network, as shown, for example, in FIG. 1), and/or may be implemented at one or more distributed CMTS (DCMTS) systems (e.g. residing at one or more fiber nodes, as shown, for example, in FIG. 6).

Further, it will be appreciated by one having ordinary skill in the art that the technique of the present invention may be implemented in any computer network having a standardized protocol for utilizing a central termination system (e.g. head end) to schedule timeslots for remote stations or nodes on a return (or upstream) channel. In wireless networks, the central termination system may be referred to as a head end or wireless base station. In satellite networks, the central termination system may be referred to as a master controlling station.

Figure 7:
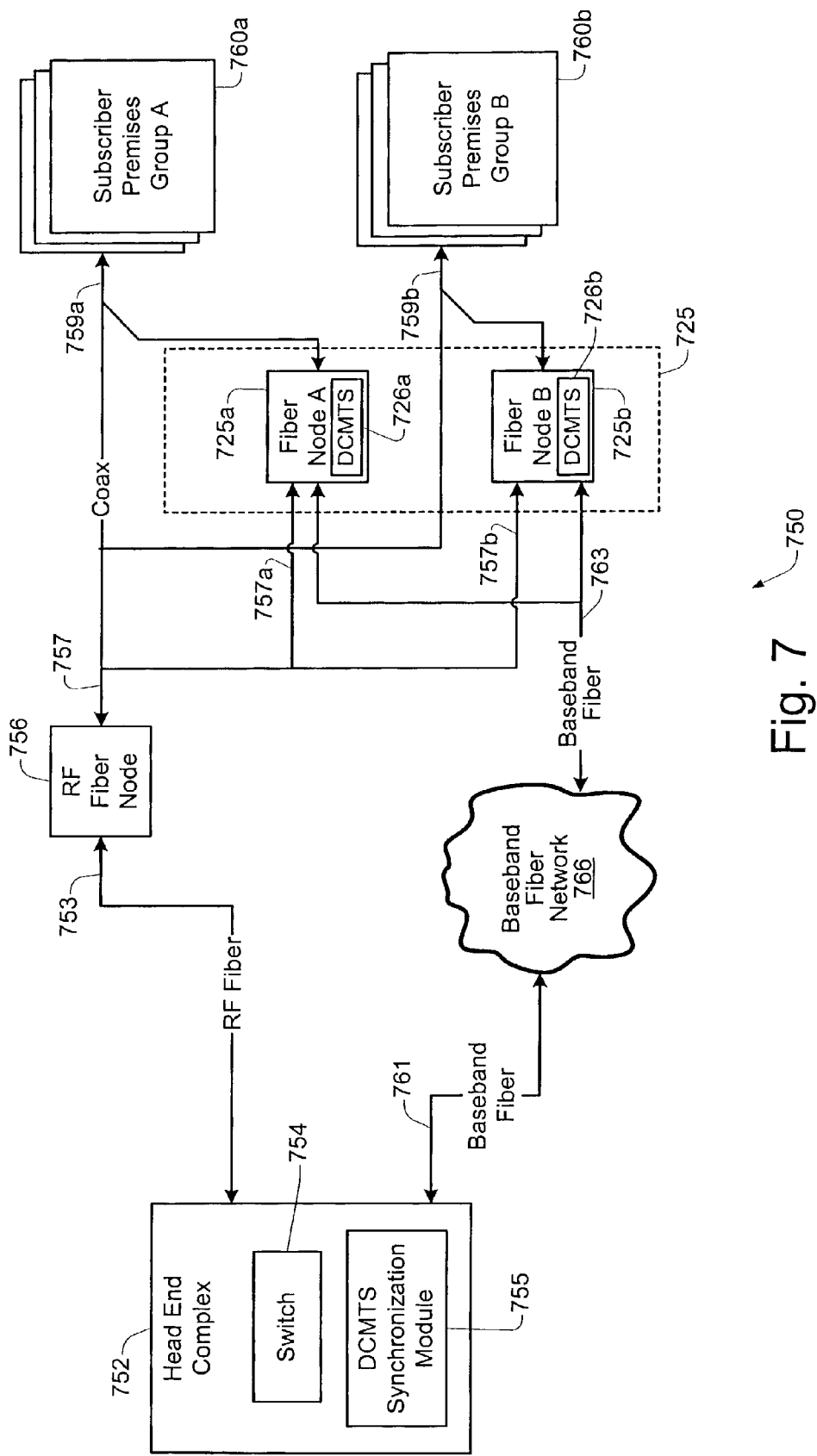
FIG. 7 is a block diagram that illustrates another cable network.

FIGS. 6 and 7 illustrate specific embodiments of cable networks that may be used for implementing the techniques of the present invention. In the embodiment of FIG. 6, the head end complex 602 includes a centralized CMTS device 601 that may be configured to implement DOCSIS functionality. A specific embodiment of the CMTS 601 is described in greater detail below with respect to FIGS. 6 and 7.

As show in FIG. 6, the cable network 600 includes two different types of fiber nodes, namely RF fiber nodes (e.g. 606), and fiber nodes (e.g., 620a and 620b). According to a specific embodiment, the RF fiber node 606 may be configured as a conventional fiber node such as fiber nodes 106 of FIG. 1. According to a specific implementation, the RF fiber node 606 may be configured to handle all legacy RF downstream and upstream communications (such as, for example, set-top box signals, telemetry signals, etc., and communications that occur on centralized DOCSIS channels), and may be configured to perform additional functions associated with conventional fiber nodes.

As shown in the embodiment of FIG. 6, a baseband fiber network 616 may be deployed that is coupled to the conventional cable network. The baseband fiber network may include a plurality of fiber nodes 620, which are also coupled to the conventional fiber network. Each fiber node may be inserted into the cable network 600 using a combiner and/or splitter that may be used to add and/or separate DOCSIS signals into/from the RF lineup.

Communication between the head end complex 602 and the plurality of fiber nodes 620 may be accomplished via the baseband fiber network 616. For example, according to a specific implementation, one or more IP tunnels may be formed between the head end complex 602 and the plurality of fiber nodes 620 in order to allow for transmission and reception of IP packets. In a specific implementation, the IP tunnel(s) may be formed between the CMTS 601 and one or more DCMTS devices 626a, 626b (residing at one or more fiber nodes). The CMTS 601 may be configured to handle layer 3 functionality, including packet-related decisions, network layer decisions, IP related decisions, etc. Additionally, according to a specific implementation, the CMTS may also be responsible for handing redundancy and/or failover functionality for selected DCMTS devices.

According to specific embodiments of the present invention, each fiber node may include a distributed CMTS device (herein referred to as a "DCMTS"), which is configured to receive and transmit baseband optical signals from/to the head end complex 602 via baseband fiber network 616. According to a specific implementation, the DCMTS may be configured to perform conversions between packet protocols implemented over the baseband fiber media (e.g., 611 and 613) and DOCSIS protocols implemented on the coax media (e.g. 609*a* and 609*b*). According to a specific embodiment, the functionality of the DCMTS may include all or a selected portion of the functionality provided by a conventional CMTS device. For example, the DCMTS may perform, at a relatively local level, at least a portion of the scheduling or MAC functions typically performed by conventional CMTS devices residing at the head end complex. Additionally, the DCMTS may be configured to handle layer 1 and layer 2 functionality such as the OSI layer management (e.g. physical layer, RF layer, hardware), MAC layer management, data link layer management, framing functionality, DOCSIS protocol functionality, timestamp functionality, etc.

According to a specific implementations of the present invention, the fiber nodes may be pushed deeper into the network (i.e. closer to the subscriber groups) than conventional RF fiber nodes, which, as illustrated in FIG. 6, may result in a plurality of fiber nodes 620 servicing subscriber groups (e.g. 610*a* and 610*b*) which are serviced by a single RF fiber node 606. For example, the RF fiber node 606 may be configured to service 600 households past (HHP) while each fiber node may be configured to service 100 households past, resulting in 2 fiber nodes (620*a* and 620*b*) servicing the 600 households that are serviced by the RF fiber node 606.

In addition to being configured to receive baseband optical signals, the fiber nodes 620 may also be configured to receive electrical signals from the RF fiber nodes via coax lines (e.g. 607A and 607B). Such electrical signals may include, for example, clock or other timing reference signals and/or timestamp synchronization signals.

FIG. 7 shows an alternate embodiment of a cable network 750, which may be used for implementing the methods of the present invention. In the cable network of FIG. 7, the centralized CMTS typically residing at the head end complex 752 has been removed, and its functionality incorporated into selected DCMTS devices (e.g. 726*a*, 726*b*) residing in the fiber nodes 725. Thus, according to the embodiment of FIG. 7, selected DCMTS devices residing in the fiber nodes 725 may be configured to implement the functions typically implemented by the centralized CMTS device, such as, for example, layer 3 functionality and/or at least a portion of the functionality performed by the various logic described with respect to FIGS. 4 and 5 of the drawings.

According to a specific embodiment, communication of IP packets between the head end complex 752 and the plurality of fiber nodes 755 may be accomplished without the use of a tunneling protocol. In such an embodiment, communication between network devices may be accomplished using, for example, a standardized IP protocol. Additionally, as shown in the embodiment of FIG. 7, the head end complex 752 may include a switch 754 (e.g., an Ethernet switch), or other type of traffic handling device that may be configured to route or forward traffic between network devices in the cable network 750, or between the devices in the cable network and devices in external networks. Further, as shown in the example of FIG. 7, the head end complex may also include a DCMTS Synchronization Module 755, which may be configured to provide synchronized clock reference signals and/or synchronized timestamp information to the plurality of fiber nodes 725.

While the discussion to this point has focused on techniques for cable networks, the technology of the present invention may be applied to any access or shared-access network having a plurality of hosts or nodes that share at least one channel for communicating with at least one "head end" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic-handling device (e.g., a switch or router) for providing control capabilities in a network having at least one traffic-handling device (e.g., another switch or router) that provides normal service to a host. In a wireless system (e.g., as represented by FIG. 8) the plurality of nodes or hosts corresponds to the plurality of wireless nodes 850, which use at least one shared access channel to communicate with at least one access control system 822 located at the head end of the wireless system.

Figure 8:
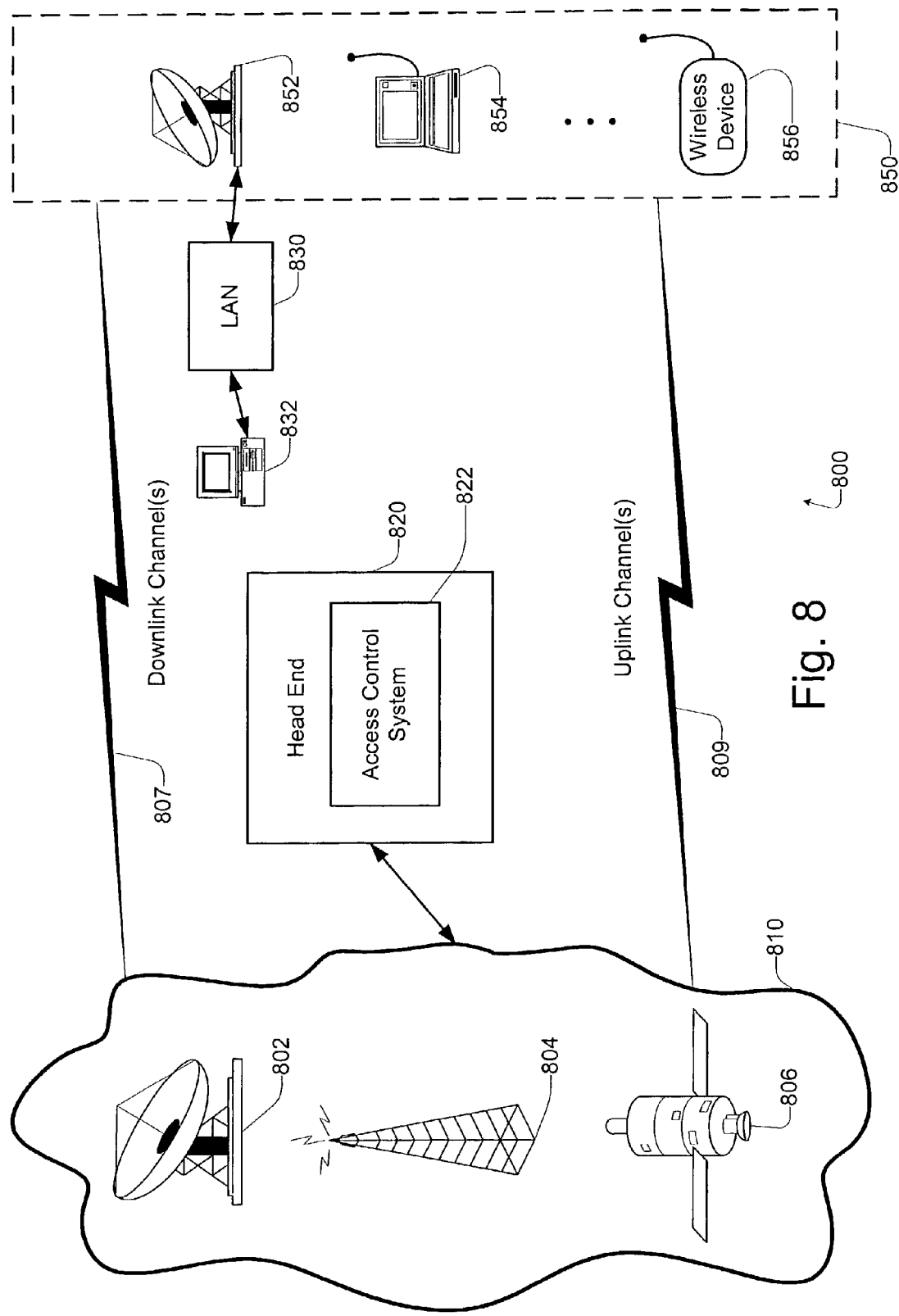
FIG. 8 is a block diagram that illustrates a network having wireless uplink and downlink channels.

FIG. 8 shows an example of a wireless data communication system 800, which may be used for implementing the technique of the present invention. As shown in FIG. 8, the wireless system includes a central termination system (or head end) 820. The head end includes an access controller or access control system (ACS) 822 that communicates with a plurality of wireless nodes 850, and coordinates access between each of the wireless nodes and the head end 820. The access controller 822 may include memory and at least one processor. In a specific embodiment, the function of the access controller 822 is analogous to that of the CMTS described above with respect to cable modem networks. It may serve as a router or switch as well.

The head end 820 communicates with a plurality of wireless nodes 850 via any one of a plurality of wireless transmitting and receiving devices 810. As shown in FIG. 8, for example, the plurality of wireless transmitting and receiving devices 810 may include satellite base stations 802, orbital satellites 806, radio towers 804, etc.

In a specific embodiment that is analogous to that of cable modem networks, the head end 820 of the wireless computer system communicates with the plurality of nodes 850 via one or more downlink channels 807 and one or more uplink channels 809. Each downlink channel 807 is a broadcast-type channel utilized by the head end to communicate with an associated group of wireless nodes within the wireless network. The uplink channel 809 is a shared-access channel, which is utilized by a group of wireless nodes (analogous to cable modems) to communicate with the head end 820. The access controller 822 stores registration parameters for the various nodes that it services. It may also store the IP addresses for nodes that it services.

In a specific embodiment of the present invention, the registration process and information is similar to that of the cable network CMTSs described above. Moreover, the techniques of the present invention for detecting and/or preventing unauthorized quality of service upgrades may be implemented in wireless system 800.

The wireless devices or nodes 850 may include any one of a number of wireless transmitting/receiving devices. For example, a satellite dish 852 may be used to communicate with the head end 820 via the uplink and downlink channels. The satellite dish may, in turn, be connected to a local area network (LAN) 830, which may be further connected to one or more computer systems 832. Another wireless device may be a portable/wireless computer system 854, which is able to transmit and receive information to the head end via uplink and downlink channels 807 and 809. Other wireless devices 856 may include, for example, wireless telephones, handheld computing devices, etc.

In specific embodiments where the uplink and downlink channels within the wireless system 800 are utilized in a manner similar to that of the upstream and downstream channels of a cable modem network, the above-described techniques may easily be implemented in wireless system 800 using the detailed description of the present invention provided herein. Moreover, the techniques of the present invention may be easily implemented in any computer network that uses shared access channels for communicating between a centralized computing system and one or more remote nodes.

While the invention has been particularly shown and described with reference to specific embodiments thereof, it will be understood by those skilled in the art that changes in the form and details of the disclosed embodiments may be made without departing from the spirit or scope of the invention. For example, it will be appreciated that the methods of the present invention are not limited to cable networks and may be applied to any access data network that uses at least one shared access communication channel to communicate between a plurality of nodes in the network and a terminal to which the plurality of nodes is connected. Therefore, the scope of the invention should be determined with reference to the appended claims.

We claim:

1. A method of controlling upstream bandwidth utilization of a cable modem in a cable network, the cable modem having an original service level, wherein the method is implemented on a programmable machine on the cable network, the method comprising:

using a first token bucket having a first capacity $B1$ for first tokens, each first token authorizing the network subscriber to transmit a unit of data, the first tokens added to the token bucket at a rate $R1$ that equals the first capacity $B1$ divided by a first time period $T1$;

controlling the first token bucket by using a second token bucket having a second capacity $B2$ for second tokens added to the second token bucket at a second rate $R2$ that equals the second capacity $B2$ divided by a second time period $T2$ greater than $T1$, to measure upstream bandwidth utilization, wherein said second token bucket has a time period $T2$ that is at least 100 times larger than the time period $T1$ of the first token bucket, and wherein said second token bucket has a second capacity $B2$ that is at least 100 times larger than the first capacity $B1$ of the first token bucket;

wherein the controlling is based, at least in part, upon a determination of whether the subscriber's upstream traffic exceeds a predetermined level over a predetermined period of time based on the cable modem's original service level:

informing a cable modem termination system (CMTS) if the cable modem is transmitting excessive amounts of data upstream, thereby potentially exceeding an amount allowed in the original service level; and implementing a modified service level for the cable modem based on an upstream bandwidth utilization of the cable modem, wherein the modified service level is applied directly to the cable modem using the first token bucket and the second token bucket, thereby eliminating the need for the cable modem to re-register with the CMTS.

2. A method as recited in claim 1 further comprising: transmitting a warning message to a user if the upstream bandwidth utilization exceeds the original service level.

3. A method as recited in claim 1 further comprising: increasing payment requirements of a user if the upstream bandwidth utilization exceeds the original service level.

4. A method as recited in claim 1 further comprising: decreasing payment requirements of the user if the upstream bandwidth utilization is consistently below the original service level.

5. A method as recited in claim 1 further comprising: modifying service attributes of a user if the upstream bandwidth utilization exceeds the original service level.

6. A method as recited in claim 1 wherein implementing a modified service level further comprises maintaining a current login session and applying the modified service level directly to the cable modem.

7. The method of claim 1 wherein said second token bucket capacity $B2$ is equal to the size of a token $S2$ used in the second token bucket, and wherein only one token flows into the second token bucket during each time period $T2$.

8. An apparatus for controlling upstream bandwidth utilization of a cable modem user in a cable network, the cable modem having an original service level, the apparatus comprising:

means for using a first token bucket having a first capacity $B1$ for first tokens, each first token authorizing the network subscriber to transmit a unit of data, the first tokens added to the token bucket at a rate $R1$ that equals the first capacity $B1$ divided by a first time period $T1$;

means for controlling the first token bucket by using a second token bucket having a second capacity $B2$ for second tokens added to the second token bucket at a second rate $R2$ that equals the second capacity $B2$ divided by a second time period $T2$ greater than $T1$, to measure upstream bandwidth utilization, wherein said second token bucket has a time period $T2$ that is at least 100 times larger than the time period $T1$ of the first token bucket, and wherein said second token bucket has a second capacity $B2$ that is at least 100 times larger than the first capacity $B1$ of the first token bucket;

wherein the controlling is based, at least in part, upon a determination of whether the subscriber's upstream traffic exceeds a predetermined level over a predetermined period of time based on the cable modem's original service level;

means for informing a cable modem termination system (CMTS) if the cable modem is transmitting excessive amounts of data upstream, thereby potentially exceeding an amount allowed in the original service level; and means for implementing a modified service level for the cable modem based on an upstream bandwidth utilization of the cable modem, wherein the modified service level is applied directly to the cable modem using the first token bucket and the second token bucket, thereby eliminating the need for the cable modem to re-register with the CMTS.

9. An apparatus as recited in claim 8 further comprising: means for transmitting a warning message to a user if the upstream bandwidth utilization exceeds the original service level.

10. An apparatus as recited in claim 8 further comprising: means for increasing payment requirements of a user if the upstream bandwidth utilization exceeds the original service level.

11. An apparatus as recited in claim 8 further comprising: means for decreasing payment requirements of the user if the upstream bandwidth utilization is consistently below the original service level.

12. An apparatus as recited in claim 8 further comprising: means for modifying service attributes of a user if the upstream bandwidth utilization exceeds the original service level.

13. An apparatus as recited in claim 8 wherein means for implementing a modified service level further comprises: means for maintaining a current login session and applying the modified service level directly to the cable modem.

14. A method implemented on a programmable machine on a cable network, the method comprising:
regulating upstream traffic and controlling bandwidth utilization of a network subscriber by using a first token bucket having a first capacity $B1$ for first tokens, each first token authorizing the network subscriber to transmit a unit of data, the first tokens added to the token bucket at a rate $R1$ that equals the first capacity $B1$ divided by a first time period $T1$;
controlling the first token bucket by using a second token bucket having a second capacity $B2$ for second tokens added to the second token bucket at a second rate $R2$ that equals the second capacity $B2$ divided by a second time period $T2$ greater than $T1$,
wherein said second token bucket has a time period $T2$ that is at least 100 times larger than the time period $T1$ of the first token bucket, and
wherein said second token bucket has a second capacity $B2$ that is at least 100 times larger than the first capacity $B1$ of the first token bucket;
wherein the controlling is based, at least in part, upon a determination of whether the subscriber's upstream traffic exceeds a predetermined level over a predetermined period of time.

15. A method implemented on a programmable machine on the cable network, the method comprising:
regulating upstream traffic and controlling bandwidth utilization of a network subscriber by using a first token bucket having a first capacity $B1$ for first tokens, each first token authorizing the network subscriber to transmit a unit of data, the first tokens added to the token bucket at a rate $R1$ that equals the first capacity $B1$ divided by a first time period $T1$;
controlling the first token bucket by using a second token bucket having a second capacity $B2$ for second tokens added to the second token bucket at a second rate $R2$ that equals the second capacity $B2$ divided by a second time period $T2$ greater than $T1$,
wherein said second token bucket has a time period $T2$ that is at least 100 times larger than the time period $T1$ of the first token bucket, and
wherein said second token bucket has a second capacity $B2$ that is at least 100 times larger than the first capacity $B1$ of the first token bucket, and
wherein the controlling is based, at least in part, upon a determination of whether the subscriber's upstream traffic exceeds a predetermined level over a predetermined period of time, and
wherein the controlling comprises changing the network subscriber's priority of service according to the determination.

16. A method implemented on a programmable machine on a cable network, the method comprising:
regulating upstream traffic and controlling bandwidth utilization of a network subscriber by using a first token bucket having a first capacity $B1$ for first tokens, each first token authorizing the network subscriber to transmit a unit of data, the first tokens added to the token bucket at a rate $R1$ that equals the first capacity $B1$ divided by a first time period $T1$;
controlling the first token bucket by using a second token bucket having a second capacity $B2$ for second tokens added to the second token bucket at a second rate $R2$ that equals the second capacity $B2$ divided by a second time period $T2$ greater than $T1$,
wherein said second token bucket has a time period $T2$ that is at least 100 times larger than the time period $T1$ of the first token bucket, and
wherein said second token bucket has a second capacity $B2$ that is at least 100 times larger than the first capacity $B1$ of the first token bucket, and
wherein the controlling is based, at least in part, upon a determination of whether the subscriber's upstream traffic exceeds a predetermined level over a predetermined period of time, and
wherein the controlling comprises increasing payment requirements of a user if the upstream bandwidth utilization exceeds the original service level.

17. A method implemented on a programmable machine on a cable network, the method comprising:
regulating upstream traffic and controlling bandwidth utilization of a network subscriber by using a first token bucket having a first capacity $B1$ for first tokens, each first token authorizing the network subscriber to transmit a unit of data, the first tokens added to the token bucket at a rate $R1$ that equals the first capacity $B1$ divided by a first time period $T1$;
controlling the first token bucket by using a second token bucket having a second capacity $B2$ for second tokens added to the second token bucket at a second rate $R2$ that equals the second capacity $B2$ divided by a second time period $T2$ greater than $T1$,
wherein said second token bucket has a time period $T2$ that is at least 100 times larger than the time period $T1$ of the first token bucket, and
wherein said second token bucket has a second capacity $B2$ that is at least 100 times larger than the first capacity $B1$ of the first token bucket, and
wherein the controlling is based, at least in part, upon a determination of whether the subscriber's upstream traffic exceeds a predetermined level over a predetermined period of time, and
wherein the controlling comprises implementing a modified service level for the network subscriber and applying the modified service level while maintaining a current login session of the network subscriber.

* * * * *

UNITED STATES PATENT AND TRADEMARK OFFICE
CERTIFICATE OF CORRECTION

PATENT NO.        : 7,627,675 B2                                          Page 1 of 1
APPLICATION NO. : 10/428865
DATED             : December 1, 2009
INVENTOR(S)       : Bernstein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this

Twenty-first Day of December, 2010

David J. Kappos
*Director of the United States Patent and Trademark Office*